WETHRELL & MORGAN.
Shaping Metal.
No. 16,940.  Patented March 31, 1857.
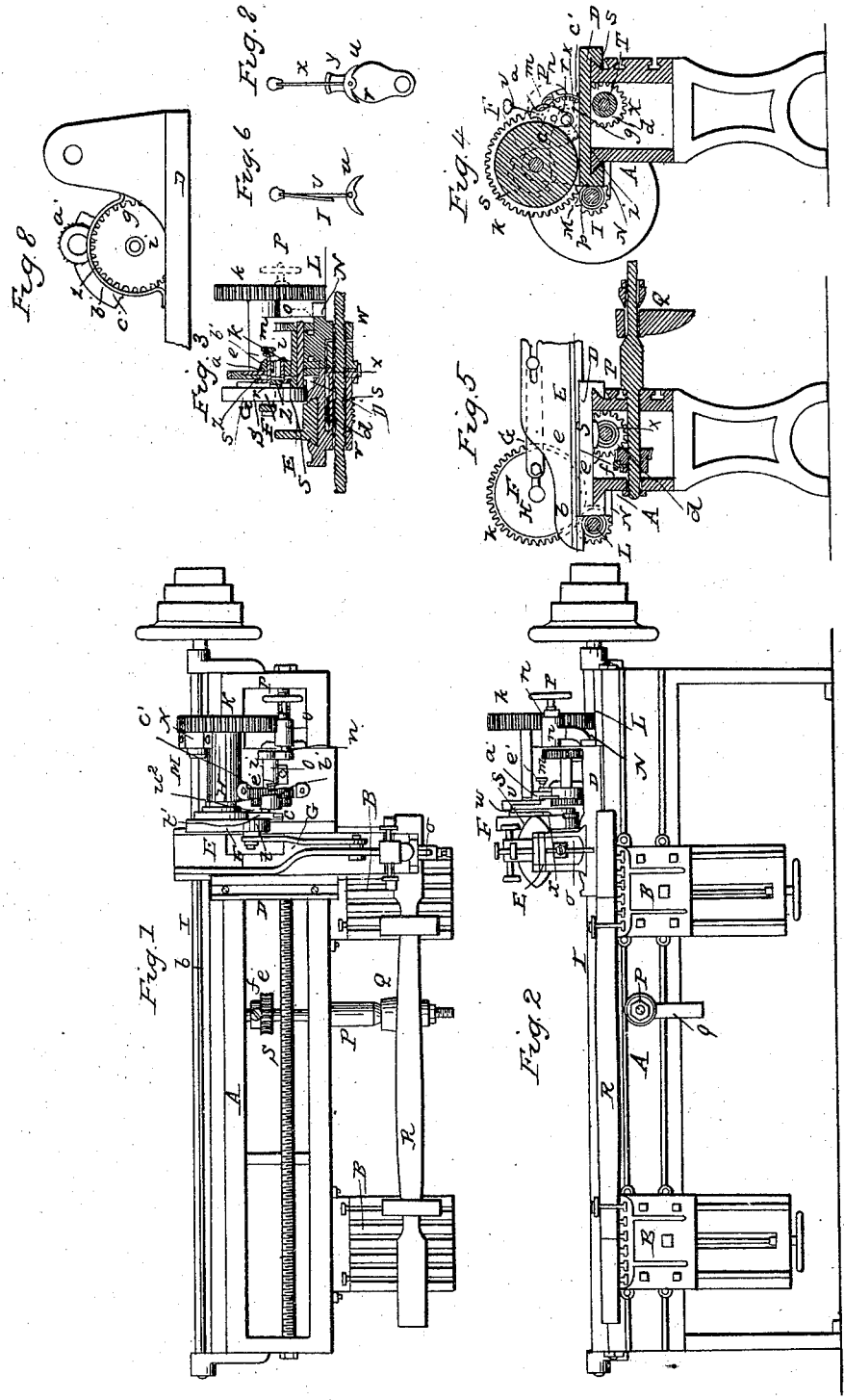

UNITED STATES PATENT OFFICE.

SYLVANUS JAS. WETHRELL AND EUSTIS P. MORGAN, OF BIDDEFORD, MAINE.

SHAPING-ENGINE.

Specification of Letters Patent No. 16,940, dated March 31, 1857.

*To all whom it may concern:*

Be it known that we, SYLVANUS JAS. WETHRELL and EUSTIS P. MORGAN, both of Biddeford, in the county of York and State of Maine, have invented a certain new and useful Improvement in Shaping-Engines; and we do hereby declare that the same is fully described and represented in the following specification and the accompanying drawings, letters, figures, and references thereof.

Of the said drawings Figure 1 denotes a top view of our improved shaping engine. Fig. 2 is a front elevation of it. Fig. 3 is a longitudinal and vertical section of the main carriage and a part of the stationary screw under it. Fig. 4 is a transverse section showing a side view of the rocker arm and parts immediately adjacent thereto and hereinafter described. Fig. 5 is a transverse and vertical section taken through the mandrel.

The "shaping machine" or "shaping engine," as it is often termed, is a planing machine, in which the cutting tool is moved to and fro, with short strokes, so as to plane a piece of work fixed either on an adjustable bed or a revolving mandrel. In the ordinary machine, the main carriage, which supports the secondary or tool carriage or "spindle," as it is commonly called, is moved or fed along in the frame or bed ways by means of a long revolving screw turned by a pawl and toothed wheel movement, arranged at one end of the machine, the screw being made to move in a female screw fixed to the main carriage. The revolving mandrel has been turned around by another pawl operating on a large wheel fixed on a splined shaft, on which was an endless screw made to work in a worm gear fixed on the mandrel. The disadvantage of this arrangement is that the workman or attendant on the machine, in order to adjust or change the feed motion of it, is compelled to leave his work and go to the end of the machine. By our improvement the workman can perform all such operations without losing sight of the work or being put to the necessity of leaving it for a moment.

In the said drawings, A denotes the main or bed rail frame of the machine.

B B are the adjustable platforms for supporting the work R, they being each so applied to the frame A as to be capable of being moved either horizontally or vertically and held or clamped firmly in any desirable position. In this respect, in our machine, they do not essentially differ from those used in ordinary shaping engines.

D is the main carriage which rests and moves on bed rails of the frame A and carries a secondary carriage or "spindle" E, which slides back and forth in horizontal and transverse directions and has a reciprocating rectilinear motion imparted to it by means of crank wheel or head F and a connecting rod G, such crank wheel being placed on one end of a horizontal rotary shaft H. The said shaft H derives its rotary motion from a splined driving shaft I, with which it is connected by two gears K L, the former of which is fixed on the shaft H, while the latter is placed on a short tubular shaft M, that runs in a box N affixed to the main carriage D. The spline or groove of the shaft I is seen at $b$, it being made to receive a small stud projecting from the tubular shaft. The carriage D while moving on its ways is thus made to move the tubular shaft on the shaft I, while the latter by means of the spline and feather or stud connection (one well known to mechanics) puts in rotation the said tubular shaft and the pinion gear attached to it.

As the mode of applying the cutting tool O to the reciprocating or secondary carriage E is essentially like that adopted in other shaping engines and as such constitutes no part of our invention, it will be unnecessary to enter into any description of it.

The mandrel for circular work is seen at P, it being applied to the main frame in the usual way. A crank or piece of work Q is represented upon it. There is also a piece of work R (a connecting rod) shown as applied on the platforms B B. Extending between the slide ways and from end to end of the frame of the machine is a long screw S, which is fastened at its two extremities, so as to be perfectly stationary. This screw is made to extend through two tubular shafts T U, which are placed end against end and between two projections V W extended down from the bottom or underside of the carriage D, as seen in Fig. 3. The screw passes through cylindrical or other proper shaped holes or passages made through these projections. Two gear wheels X Y, of the same size, are respectively fixed on the inner ends of two tubular shafts T U, and there is a female screw $c$ formed within the shaft U and with a thread corresponding to and to engage with that of the screw S. There is also a worm or endless screw d cut or formed on and around the exterior surface of the tubular shaft T, which when moved directly over the mandrel is made to engage with a worm gear e fixed on the mandrel P, the said worm gear being so applied to the mandrel as to be capable of being moved on the shaft and out of the path of the worm screw d, while the carriage D is in movement on its ways, also so as to be brought up and directly under the worm screw d when it is moved directly over the mandrel and for the purpose of putting such mandrel in rotation. A set screw f serves to confine the worm gear to the mandrel under such circumstances. The two gears X Y engage respectively with two other and equal gears g h, that are placed on a short shaft i, that rotates in a bearing i', fixed on the main carriage D. One of these gear wheels (viz. g) rotates freely on the said shaft, while the other, (viz. h) is fixed to the shaft and rotates with it. A pin k passed through the two gears g h serves to so fix the former to the latter as to enable them to be put in rotation together. There is another gear wheel Z fixed on the shaft i and made to engage with a pinion gear m, fixed on one end of a horizontal shaft n, that is supported by an arm o and has a hand wheel p fixed on its end.

A rocker lever or arm r works on the inner end of the shaft i and has a reciprocating rotary motion imparted to it through a sector of a circle by means of an eccentric s and a connecting arm t, the said eccentric being fixed on the shaft H. The rocker arm r carries a double pawl u, of the form as seen in Fig. 4 and in Fig. 6, which is a separate side view of the pawl. This pawl has an arm v extended up from it. To one side of this arm there is a spring x, that extends down into a projection y from the outer end of the rocker arm, as seen in Fig. 7, which is a side view of the rocker arm and pawl. There is also a cover plate z, that lies under the pawl, and between it and the gear g, and extends partially around the periphery of the gear, as seen in the drawings. This cover plate is attached to a clamp a', that slides on a curved rail b', extended upward from a frame c', which is made to project upward from the carriage D and to extend over the gear, as seen in side view in Fig. 8. The clamp a' is provided with a clamp screw e', by which it may be fixed in any position on the rail b'. By moving the cover plate z, and setting it in a proper position one tooth of the pawl, when such pawl is in movement, may be brought into action on the gear wheel g, so as to cause such gear to be put in rotation in one direction. By another movement of the cover plate and fixing it in another proper position, as is well understood by mechanics, the said tooth of the pawl may be thrown out of action and the other tooth put into action, so as to produce a movement of the gear in the opposite direction. By such means the workman has the ability to "reverse the feed" of the tool whenever necessary, and without moving away from the work. While the two gears g h are connected by the pin k the female screw c will be rotated on the screw S whenever the gear g is rotated; but when the two gears g h are disconnected the female screw can only be rotated by means of the workman applying his hand to the hand wheel p. As the carriage D is fixed stationary, while the tool is in operation on the work placed on the mandrel, the female screw must be kept stationary during such time, otherwise a feed movement of the carriage would result. By removal of the pin k from the two gears no movement of the female screw can be effected when the gear g is put in rotation. The shaft T however will continue to rotate. While a piece of work placed on the platform is being planed the pin k is inserted through the two gears g h. This causes the feed of the tool over such work to take place, and this feed movement may be effected either by the operation of the double pawl or by the workman moving the hand wheel p. In case it is accomplished in the latter way, the cover plate z should be first so moved and fixed as to prevent the pawl from any action on the teeth of the wheel g, the length of the cover plate being made greater than that of the path of the teeth of the pawl. When the cutting tool is in operation on a piece of work fixed on the mandrel, the feed may be effected, either by the operation of the double pawl or by the workman applying his hand to the hand wheel. The feed is therefore at all times under the direct control of the workman without his being subjected to a movement away from the work or one where his eye cannot be conveniently fixed on it.

We do not claim for the purpose of feeding the main carriage along on its ways, a long revolving male screw turned by a pawl and toothed wheel movement or engaged at one end of the machine and made to revolve in a female screw fixed and made stationary on the main carriage. Nor do we claim, for the purpose of turning the revolving mandrel, a rotary splined shaft and an endless worm or screw made to work in a worm gear fixed on the mandrel, all the same making parts of the well known Whitworth's patent universal shaping machine; but What we do claim is—

To make the screw S a stationary male screw, and the female screw c (attached to the carriage D and made to work on the screw S) a rotary screw, and to combine with them and the gear *g* (by which and the gear X the shaft T is rotated) the gears Y and *h*, (the latter being made to rotate on the shaft *i* and to be fixed to the former, as occasion may require, by a pin *k* or its equivalent) a rocker arm *r* and double pawl *u* (or mechanical equivalent therefor) applied to the shaft *i* and operated essentially as described, the whole being to enable a workman to control the operations of the machine as stated without being obliged to go to the end of the frame or leave his work, in order to adjust or change the feed motion of the cutting tool, whether it be planing, either plane, or cylindrical work.

In testimony whereof we have hereto set our signatures this twelfth day of February, A. D. 1853.

SYLVANUS JAS. WETHRELL.
E. P. MORGAN.

Witnesses:
S. A. BORTHBY,
C. M. WETHRELL.